(12) United States Patent
Lacey

(10) Patent No.: US 8,052,349 B2
(45) Date of Patent: Nov. 8, 2011

(54) STRUCTURES AND METHOD FOR COVERING LANDFILL

(76) Inventor: Grant Lloyd Lacey, Tingalpa (AU)

(*) Notice: Subject to any disclaimer, the term of this patent is extended or adjusted under 35 U.S.C. 154(b) by 229 days.

(21) Appl. No.: 12/515,164

(22) PCT Filed: Nov. 16, 2007

(86) PCT No.: PCT/AU2007/001771
§ 371 (c)(1),
(2), (4) Date: May 15, 2009

(87) PCT Pub. No.: WO2008/061294
PCT Pub. Date: May 29, 2008

(65) Prior Publication Data
US 2010/0047020 A1  Feb. 25, 2010

(30) Foreign Application Priority Data
Nov. 20, 2006  (AU) .............................. 2006906453

(51) Int. Cl.
*B09B 1/00* (2006.01)
(52) U.S. Cl. ............ 405/129.95; 405/129.9; 405/129.45
(58) Field of Classification Search ............. 405/129.95, 405/129.9, 129.45, 129.55, 129.57, 129.6, 405/129.65, 129.75, 129.8, 129.85
See application file for complete search history.

(56) References Cited

U.S. PATENT DOCUMENTS

| | | | | |
|---|---|---|---|---|
| 4,483,641 A * | 11/1984 | Stoll | ......................... | 405/129.95 |
| 4,927,317 A | 5/1990 | Acosta | | |
| 4,973,196 A | 11/1990 | Fuhr et al. | | |
| 5,201,609 A * | 4/1993 | Johnson | ..................... | 405/129.7 |
| 5,269,634 A * | 12/1993 | Chynoweth et al. | ..... | 405/129.25 |
| 5,356,452 A * | 10/1994 | Fahey | ...................... | 405/129.55 |
| 5,763,735 A * | 6/1998 | Stahl | ........................ | 405/129.55 |
| 5,855,664 A * | 1/1999 | Bielecki et al. | ............ | 405/129.9 |
| 5,863,152 A * | 1/1999 | Ingalls | ...................... | 405/129.7 |
| 6,558,080 B2 * | 5/2003 | Kozak | ........................ | 405/129.9 |
| 6,749,368 B2 * | 6/2004 | Ankeny et al. | ............. | 405/129.5 |
| 6,916,136 B2 * | 7/2005 | Layton et al. | ............. | 405/129.95 |
| 7,866,921 B2 * | 1/2011 | Stamoulis | ................. | 405/129.95 |
| 2005/0220542 A1 * | 10/2005 | Marsh et al. | ............... | 405/129.9 |

FOREIGN PATENT DOCUMENTS

| | | |
|---|---|---|
| EP | 923999 A | 6/1999 |
| GB | 2351300 A | 12/2000 |
| JP | 2003-236486 A | 8/2003 |
| WO | 9420689 A | 9/1994 |

* cited by examiner

Primary Examiner — Frederick L Lagman
(74) Attorney, Agent, or Firm — Kirton & McConkie; Evan R. Witt

(57) ABSTRACT

A modular roof like enclosed structure has attachments suitable for handling by lifting machinery to be placed on a landfill site and a perimeter strip extension which abuts or overlaps an adjoining module on the site. The modular structure is vented to allow ventilation of the landfill and the vent contains a filter to extract harmful gasses and odors. The structure also contains a liquid spray system to spray insecticide and deodorant onto the landfill and a fire retardant system which is activated automatically when smoke is detected.

14 Claims, 5 Drawing Sheets

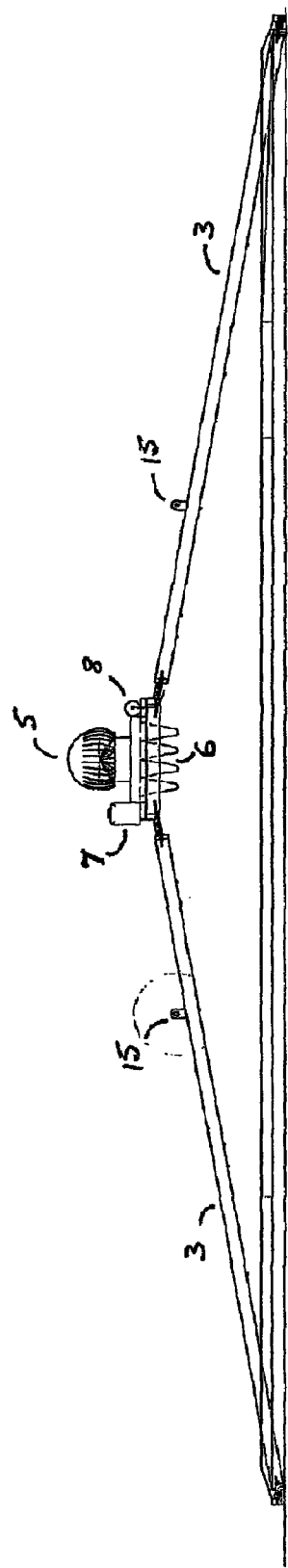

STRUCTURES AND METHOD FOR COVERING LANDFILL

FIELD OF THE INVENTION

This invention relates to structures for covering landfill rubbish tips after each leveling operation, usually at the end of the day, to secure the site until the next filling operation takes place. The industry description for such covering is Alternative Daily Cover (ADC).

BACKGROUND OF THE INVENTION

Occupational and Health Regulations require that landfill sites be covered after each day's operation to prevent fire and health hazards which can come from decomposing rubbish. Traditionally a heavy layer of clean earth about 30 cm deep, has been used to cover the layer of rubbish pushed onto the site during the day and to prevent spontaneous combustion, odors, vermin and danger to people and animals on the site.

However this traditional method is costly and time consuming since supplies of clean earth have to be retained on the site and then uniformly spread to the required depth at the end of each day. Accordingly a range of alternatives have been developed to minimise the cost of and time required for ADC.

Many of these alternatives have involved the development of clay and other mineral compositions which are spread over the layer of rubbish to form a potentially impermeable cap. However these materials also have to be stored on site or nearby and take considerable time and labor to spread over the site.

A popular alternative involves using a film of material such as polythene which is spread over the fill usually by a mobile dispensing machine. However such films have to be weighted down usually by a layer of earth which in the case of the apparatus taught in U.S. Pat. No. 6,558,079 is also deposited and rolled on the film by the machine. The resulting covering is expensive since it consumes large quantities of earth, energy and time each day and does not provide effective protection against flies, birds, vermin and fire.

Another alternative is a foam technology wherein a mobile machine dispenses dense foam to cover the layer of rubbish. However the foam can be washed away by rain and blown away by high winds and once again the method requires large quantities of material and energy. Accordingly there is a need for a cost effective ADC which does not consume costly materials and which can secure a landfill site to the standard required by the relevant regulations.

The only ADC we have found which does not consume materials is disclosed in WO0232594. This system consists of a plurality of freely mobile support members with a cable array secured to the support members to form a supporting framework. A covering membrane is attached to the supporting framework to form an enclosure over the landfill site.

Although this apparatus covers the site, the cable array is particularly cumbersome to store, erect and to cover with a membrane and it would take some time to tension the cable array as required and to restrain the walls of the enclosure at ground level. Further the membrane is prone to tearing and contamination especially at ground level. Also since it is not vented there is a probability of the build up of methane and other flammable gasses in the enclosure with the attendant risk of fire.

OBJECT OF THE INVENTION

It is therefore an object of the invention to provide an apparatus and method for covering a landfill site which overcomes the above deficiencies or at least provides a useful alternative.

STATEMENT OF THE INVENTION

According to the present invention there is provided a modular roof like enclosed structure with attachments suitable for handling by lifting machinery to be placed on a landfill site.

Preferably the modular structure is pyramidal and has a square or rectangular base.

Preferably the base of the modular structure has a perimeter strip extension which abuts or overlaps an adjoining module on the site.

Preferably the handling attachment is a bracket which extends upwards from the base and is adapted to engage with a moving machine.

Preferably the roof structure comprises a pyramid frame which is covered by an impermeable membrane.

Preferably the edge members of the pyramid frame have lugs for attachment to a lifting cable.

Preferably the apex of the roof structure is vented to allow ventilation of the landfill.

Preferably the vent contains a filter to extract harmful gasses and odors.

Preferably the roof structure contains a liquid spray system which sprays insecticide and deodorant onto the landfill.

Preferably the roof structure contains a fire retardant system which is activated automatically when smoke or fire is detected.

Preferably the roof structure contains leachate treatment processes to add biological and chemical leachate to the landfill.

Preferably the roof structure has an opening to allow access inside the structure.

According to the present invention there is also provided a method of securing a landfill site by placing two or more modular roof like structures side by side to cover the site, activating a liquid spray system contained in each modular structure to sanitise the site and operating venting means and fire retardant means within each structure.

BRIEF DESCRIPTION OF THE DRAWINGS

Various embodiments of the invention are now described by way of example only, with reference to the accompanying drawings in which:

FIG. 5 is an elevation view of the structure of FIG. 4.

DETAILED DESCRIPTION OF THE INVENTION

Figure 1:
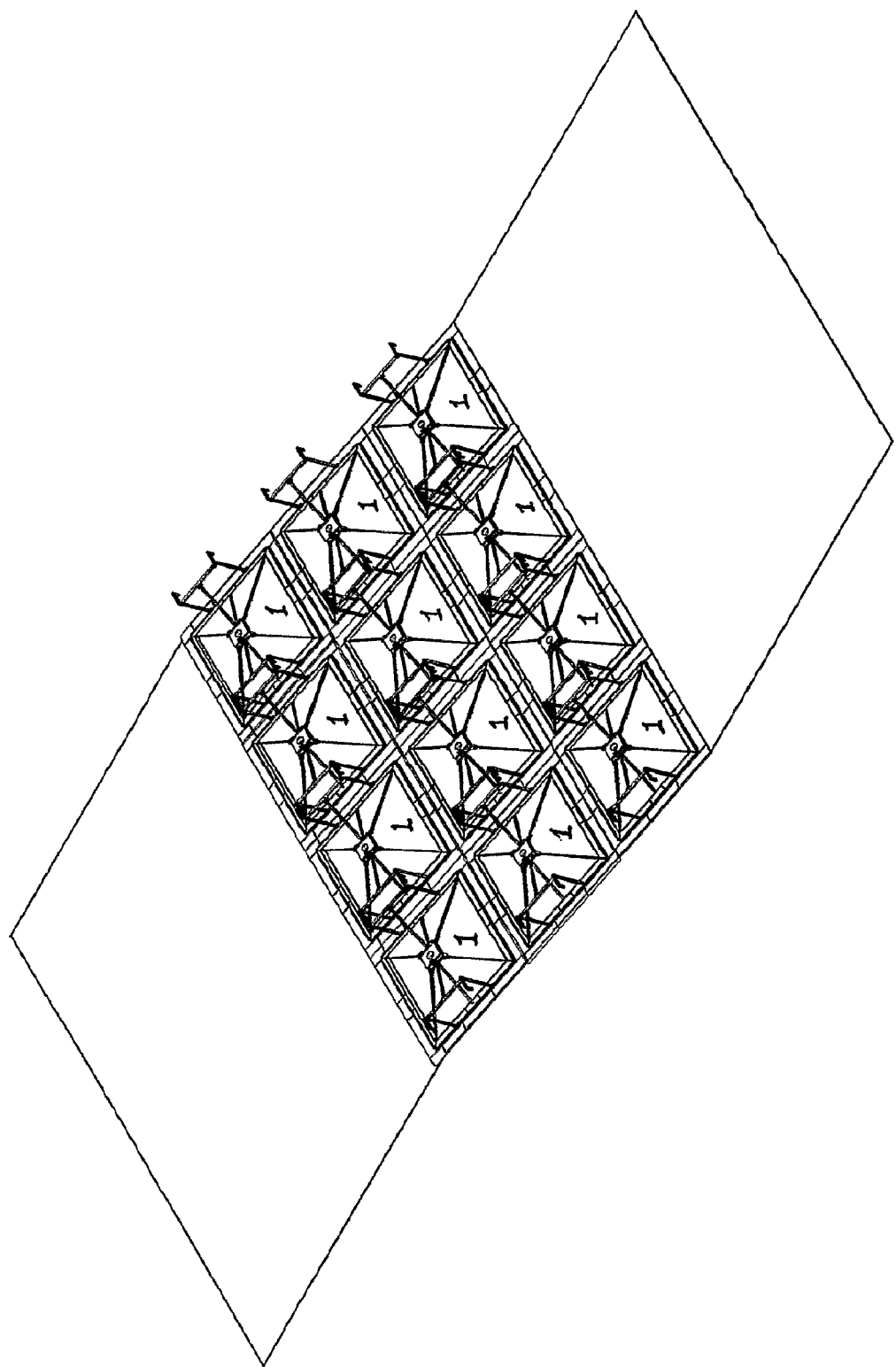
FIG. 1 is a perspective view of a sloping land fill site covered by modular roof like structures
Figure 2:
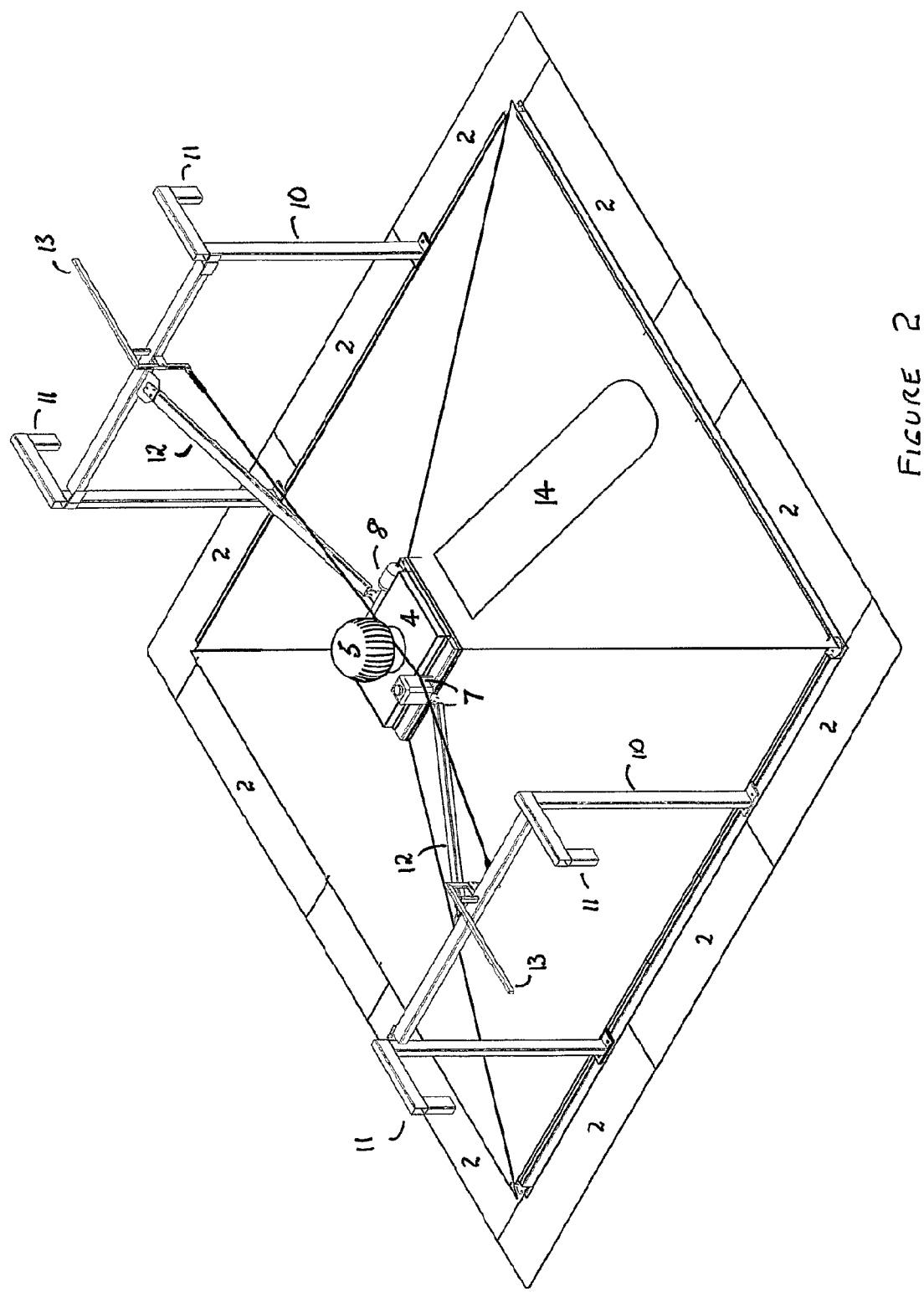
FIG. 2 is a top perspective view of a modular structure
Figure 3:
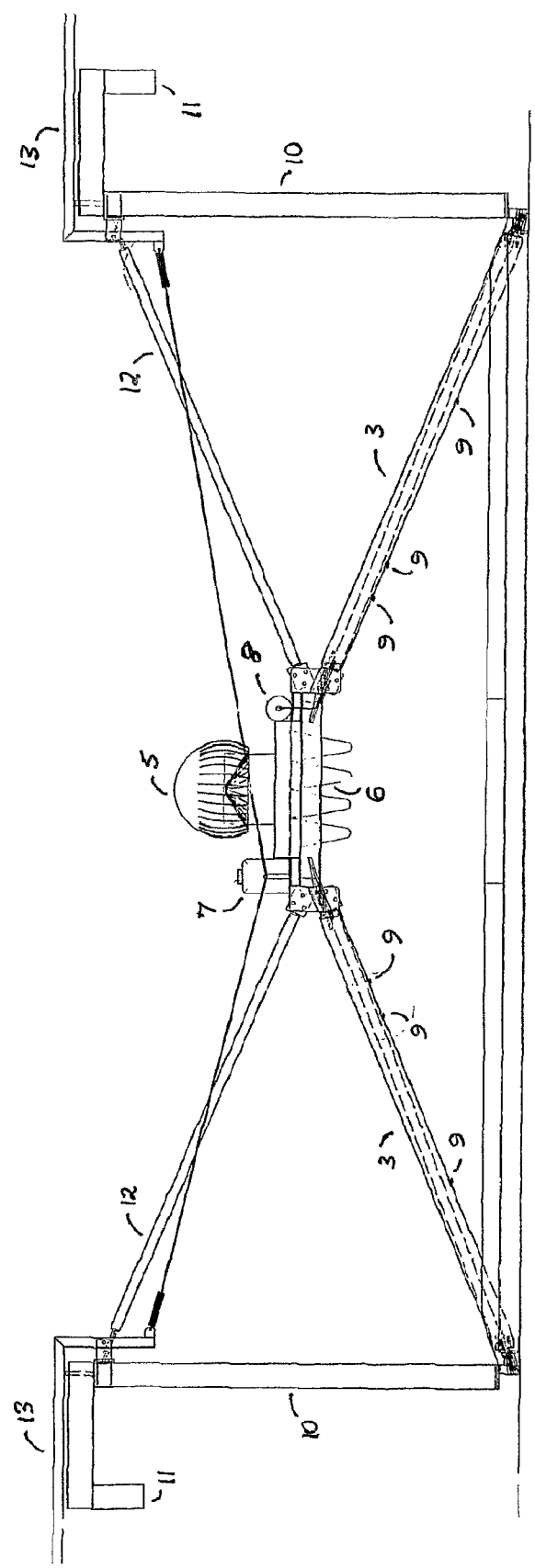
FIG. 3 is an elevation view of the structure of FIG. 2

FIG. 1 illustrates twelve modules 1 placed side by side to cover a sloping landfill site, the pyramidal construction of modules 1 having a square base with perimeter extension 2 is shown in FIG. 2. Steel struts 3 rise from the corners of the base to an apex platform 4 which houses a ventilator 5, a ventilator filter 6, a liquid spray reservoir 7 and two fire extinguishers 8.

Liquid spray reservoir 7 and fire extinguishers 8 are connected to hoses which are housed in struts 3 and feed nozzles 9 fitted to the under side of struts 3. Brackets 10 are mounted on opposite side of the square base with hook members 11 which enable a grader blade, for example, to lift the structure into place on the land fill. The top of brackets 10 are tied to apex platform 4 by struts 12.

After the structure is lifted into place, levers 13 are operated by the lifting machine to trigger the release of insecticide and deodorizer from reservoir 7 through nozzles 9. Smoke detectors (not shown) are located near filter 6 and trigger fire extinguishers 8 in the event of fire. The roof structure is enclosed by a polythene membrane with zipped flap 14 to provide access to the inside and to the accessories mounted on platform 4.

Figure 4:
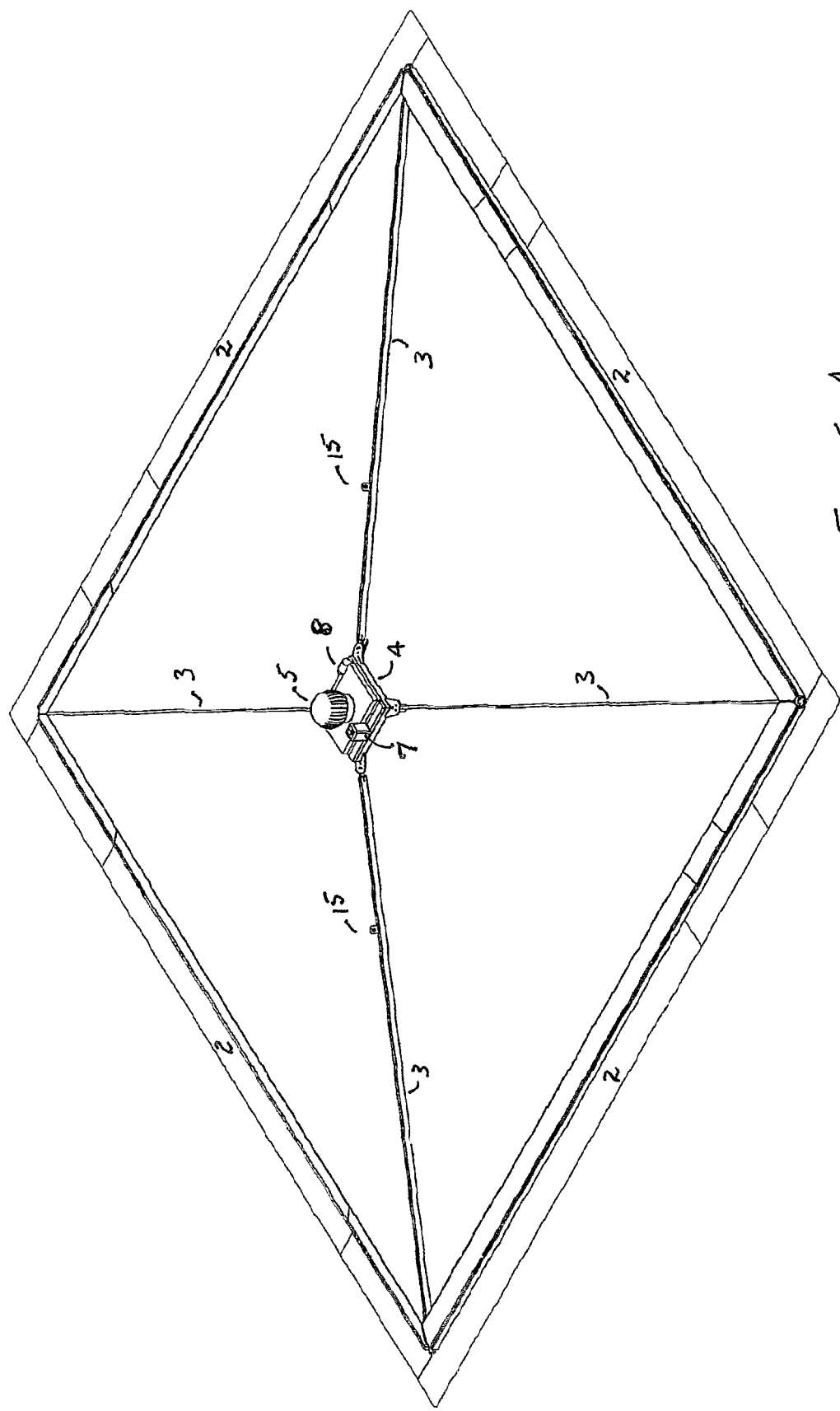
FIG. 4 is a top perspective view of an alternative structure.

A larger module of similar construction is shown in FIGS. 4 and 5. Here, size precludes lifting by an earth moving machine and a crane is required to place modules onto the landfill. Accordingly, lugs 15 are provided on the upper side of struts 3 to receive lifting cables and the liquid reservoir must be operated by a dogman or the crane driver.

VARIATIONS

It will be realised that while the foregoing has been given by way of illustrative example of this invention, all such and other modifications and variations thereto as would be apparent to persons skilled in the art are deemed to fall within the broad scope and ambit of this invention as is herein set forth. For example it will be clear that the modular structures could have a triangular or hexagonal base or a base of any other nesting shape.

Throughout the description and claims this specification the word "comprise" and variations of that word such as "comprises" and "comprising", are not intended to exclude other additives, components, integers or steps.

The invention claimed is:

1. A modular roof like enclosed structure which has attachments suitable for handling by lifting machinery to be placed on a landfill site, wherein the base has a substantially horizontal perimeter strip extension which abuts or overlaps an adjoining module on the site.

2. The modular structure of claim 1 which is pyramidal and has a square or rectangular base.

3. The modular structure of claim 2, in which a vent is disposed on a top of the modular roof like enclosed structure.

4. The modular structure of claim 3, in which the vent is disposed on a platform on the apex of the modular roof like enclosed structure.

5. The modular structure of claim 1 in which the attachment is a bracket which extends upwards from the base and is adapted to engage with a moving machine.

6. The modular structure of claim 1 which has a pyramid frame which is covered by an impermeable membrane.

7. The modular structure of claim 6 in which one or more edge members of the pyramid frame have lugs for attachment to a lifting cable.

8. The modular structure of claim 1 which is vented to allow ventilation of the landfill.

9. The modular structure of claim 8 in which the vent contains a filter to extract harmful gasses and odors.

10. The modular structure of claim 1 which contains a liquid spray system to spray insecticide and deodorant onto the landfill.

11. The modular structure of claim 1 which contains a fire retardant system which is activated automatically when smoke is detected.

12. The modular structure of claim 1 which contains leachate treatment processes to add biological and chemical leachate to the landfill.

13. The modular structure of claim 1 in which the roof has an opening to allow access inside the structure.

14. A method of securing a landfill site by placing two or more modular roof like structures side by side to cover the site, abutting or overlapping a substantially horizontal perimeter strip extension of a base of the side by side modular roof like structures, activating a liquid spray system contained in each modular structure to sanitise the site and operating venting means and fire retardant means within each structure.

* * * * *